United States Patent [19]
Saikawa

[11] Patent Number: 5,202,990
[45] Date of Patent: Apr. 13, 1993

[54] EXCLUSIVE CONTROL SYSTEM CAPABLE OF SIMPLY LOCKING EACH RESOURCE

[75] Inventor: Kouki Saikawa, Tokyo, Japan

[73] Assignee: NEC Corporation, Tokyo, Japan

[21] Appl. No.: 648,483

[22] Filed: Jan. 30, 1991

[30] Foreign Application Priority Data

Jan. 30, 1990 [JP] Japan .................. 2-19944

[51] Int. Cl.⁵ .............................. G06F 13/00
[52] U.S. Cl. .................. 395/650; 364/DIG. 1; 364/281.5
[58] Field of Search .............. 364/200 MS File; 395/650

[56] References Cited

U.S. PATENT DOCUMENTS

| 4,480,304 | 10/1984 | Carr et al. | 364/DIG. 1 |
| 4,779,194 | 10/1988 | Jennings et al. | 364/DIG. 1 |
| 4,791,554 | 12/1988 | Hirota et al. | 364/DIG. 1 |
| 4,807,111 | 2/1989 | Cohen et al. | 364/DIG. 1 |
| 4,965,719 | 10/1990 | Shoens et al. | 364/DIG. 1 |
| 4,979,105 | 12/1990 | Daly et al. | 364/DIG. 1 |
| 5,109,511 | 4/1992 | Nitta et al. | 395/650 |

Primary Examiner—Thomas M. Heckler
Attorney, Agent, or Firm—Foley & Lardner

[57] ABSTRACT

In a system for use in exclusively controlling a plurality of resources by successively putting each resource selectively into a locked state and an unlocked state, the resources are successively put into the locked state or the unlocked state in accordance with a lock order or a lock release order previously memorized in a lock order memory when a lock request or a lock release request is issued from a program. Thus, a single request can render a plurality of the resources into the locked or the unlocked state. The resources may be put into the locked and the unlocked state by the use of a lock execution unit and a lock release unit. The lock order and the lock release order may be memorized in the lock order memory in the form of a following lock table address and a preceding lock table address. Similar operation may be carried out in relation to subdivisions into which each resource is divided.

4 Claims, 6 Drawing Sheets

PRIOR ART

EXCLUSIVE CONTROL SYSTEM CAPABLE OF SIMPLY LOCKING EACH RESOURCE

BACKGROUND OF THE INVENTION

This invention relates to a system for exclusively controlling each of resources in an electronic digital computer system.

In an electronic digital computer system, a wide variety of resources are used to process tasks or jobs determined by programs. Among such resources, there are specific resources, such as I/O devices, files, data, programs, and the like, such that inconvenience is caused to occur when a plurality of programs or tasks are concurrently processed by the use of a common one of the specific resources. In order to prevent the inconvenience in the specific resources, exclusive control is carried out such that each specific resource is put into a locked state when a lock request is issued from a program to one of the specific resources. During the locked state, only the program in question can exclusively use the one of the specific resources while the other programs are prohibited from use of the one of the specific resources. Thus, each specific resource is exclusively occupied by the program.

To this end, the electronic digital computer system is provided with a system which exclusively controls each resource and which will be called an exclusive control system hereinunder. More specifically, the exclusive control system puts each resource into the locked state or occupied state in response to the lock request issued from each program. As a result, each resource is not available in the locked state by the other programs.

On the other hand, let the lock request be issued from a certain program to a particular one of the resources while the particular resource is kept in an unlocked state. In this event, the particular resource becomes available by the certain program under control of the exclusive control system. In other words, the exclusive control system permits the certain program to use the particular resource and puts the same into the locked state. Thereafter, the locked state of the particular resource is released or unlocked in response to a lock release request which is issued from the certain program when the particular resource becomes unnecessary.

Herein, consideration must be made in such an exclusive control system about occurrence of a deadlock. More particularly, such a deadlock takes place either in the case where a certain resource is already occupied or locked by a certain program while another program which occupies another resource intends to occupy or lock the certain program or in the case where a program waits for a resource which is already occupied or locked by another program. In this situation, the resources are forever kept into a waiting state or an inactive state as long as a deadlock is continued.

In order to avoid such a deadlock, proposal has been made about a method of previously determining an order of locking and releasing the resources.

It is assumed that first and second ones of the resources are successively used during preselected processing in the order of the first resource and the second resource. In this event, the first resource is at first exclusively occupied and thereafter the second resource is exclusively occupied. Specifically, when a certain program exclusively occupies the first resource and thereafter occupies the second resource, no deadlock takes place because another program that already exclusively occupies the second resource is never put into a state of waiting for the first resource.

In the meanwhile, it is necessary to shorten an occupation time so as to effectively utilize a restricted number of resources. For this purpose, each resource is divided into a plurality of partial resources or subdivisions which are individually put into the locked states. In this case, locking and releasing are carried out in response to a lock request and a lock release request in a predetermined order to lock and release the subdivisions and to prevent occurrence of the deadlock.

At any rate, the predetermined order is determined so as to avoid occurrence of the deadlock. However, a lock request and a lock release request should be issued from the programs. With this structure, occurrence of the deadlock can not be always effectively prevented when the resources are locked or released in a wrong order due to errors which occur in the programs. Accordingly, an excessive load is imposed on coding the programs so as to remove such errors from the programs. However, it is difficult to completely remove the errors from the programs. As a result, the errors are likely to occur when the lock and the lock release requests are issued from the programs.

SUMMARY OF THE INVENTION:

It is an object of this invention to provide an exclusive control system which is effective when resources are locked and released in a predetermined order which is uniquely determined.

It is another object of this invention to provide an exclusive control system of the type described, which is capable of automatically locking and releasing the resources.

According to this invention, a system to which this invention is applicable is for use in exclusively controlling a plurality of resources by selectively putting each of said resources into a locked state and an unlocked state in response to a lock request and a lock release request issued from a program, respectively. The system comprises lock order memory means for memorizing a lock order of the resources to be locked and a lock release order of the resources locked to produce a lock order signal representative of the lock order and a lock release order signal representative of the lock release order, lock executing means responsive to the lock request and the lock order signal for successively putting the resources to be locked into the locked states in accordance with the lock order signal, and lock releasing means responsive to the lock release request and the lock release order signal for successively putting the resources locked into the unlocked states in accordance with the lock release order signal.

DESCRIPTION OF THE PREFERRED EMBODIMENT

Figure 1:
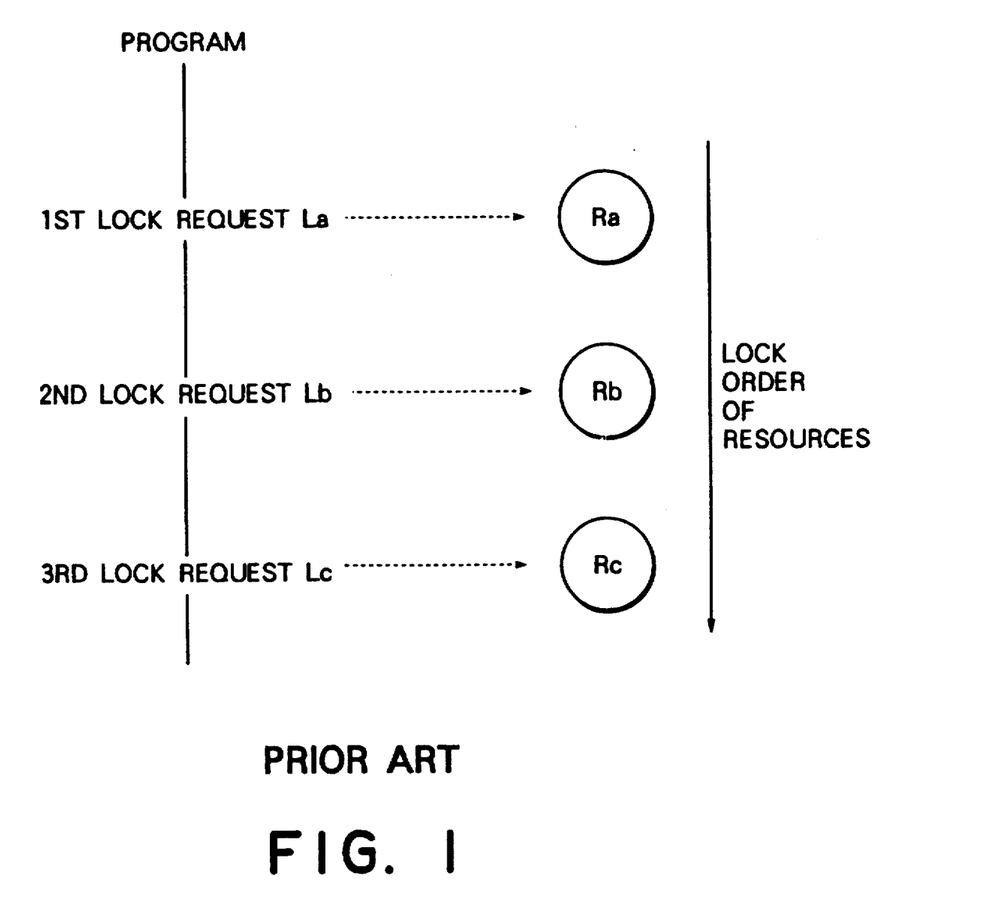
FIG. 1 shows a time chart for use in describing operation of a conventional exclusive control system.

Referring to FIG. 1, description will be made as regards operation of a conventional exclusive control system for a better understanding of this invention. As shown in FIG. 1, it is surmised that first, second, and third resources Ra, Rb, and Rc are located in an electronic digital computer system and are used by a program. In this event, the program in turn uses the first, the second, and the third resources Ra, Rb, and Rc. Therefore, the first through the third resources Ra to Rc are locked or exclusively occupied in a lock order of the first resource Ra, the second resource Rb, and the third resource Rc, as illustrated in FIG. 1. in order to exclusively occupy or lock the first through the third resources Ra to Rc in the lock order, the program has first, second, and third lock requests La, Lb, and Lc which are specified in FIG. 1 and which are successively issued from the program.

With this structure, the program delivers or issues the first lock request La to the first resource Ra and thereafter the second lock request Lb to the second resource Rb. Subsequently, the third lock request Lc is delivered from the program to the third resource Rc. Thus, the lock requests should be successively delevered or supplied from the program to the respective resources. Similar operation is carried out in connection with lock release requests. Such successive supply of the lock requests or the lock release requests makes probability of wrong operation undesirably high.

Figure 2:
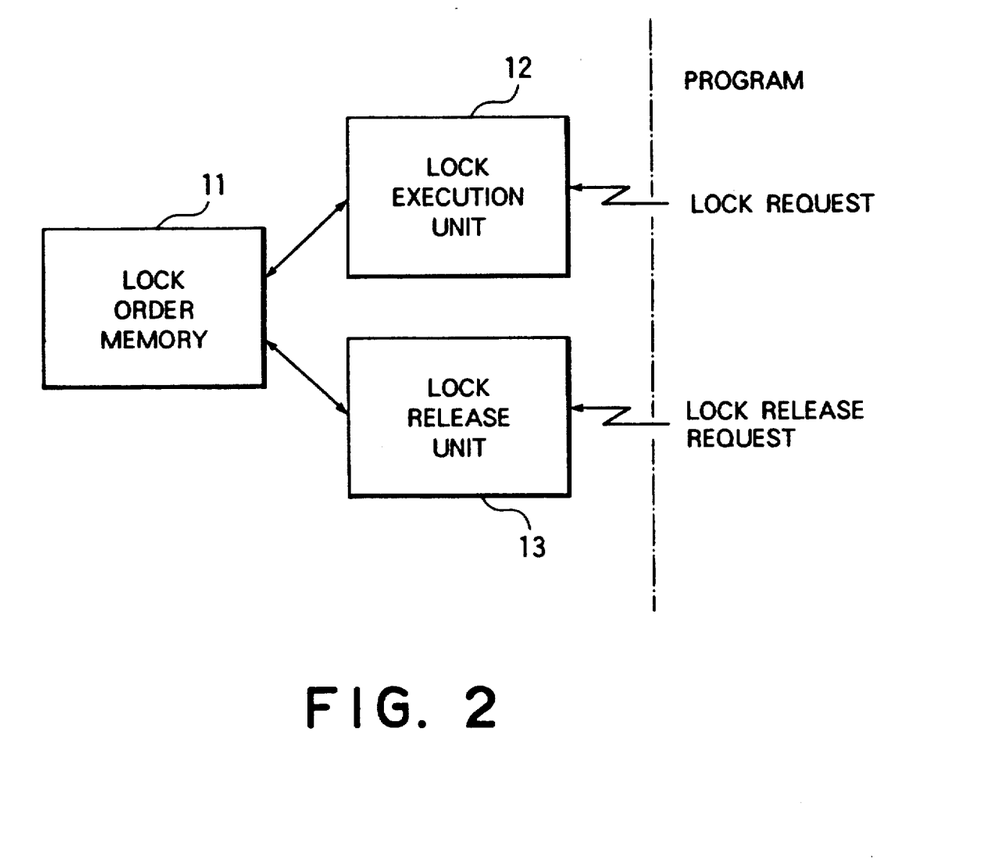
FIG. 2 is a block diagram of an exclusive control system according to a preferred embodiment of this invention.

Referring to FIG. 2, an exclusive control system according to a preferred embodiment of this invention is operable in cooperation with a program which defines tasks or jobs. The program issues a lock request and a lock release request during execution of the program. The lock request is for putting each resource into a locked state while the lock release request is for releasing the lock state of each resource to put each resource into an unlocked or released state. The illustrated exclusive control system comprises a lock order memory 11 for memorizing a lock order of the resources to produce, as a memorized content, a lock order signal representative of the lock order, a lock execution unit 12 for locking the resources with reference to the memorized content in response to the lock request sent from the program, and a lock release unit 13 for releasing the resource with reference to the memorized content in response to the lock release request.

Figure 3:
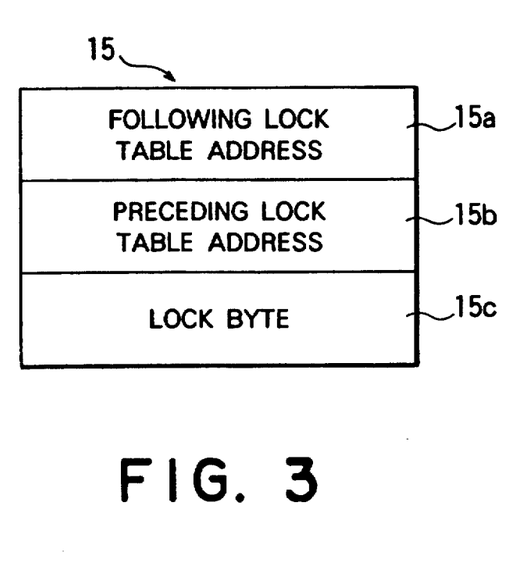
FIG. 3 is a block diagram for use in describing a lock order memory of the exclusive control system illustrated in FIG. 1.

Referring to FIG. 3 together with FIG. 2, the lock order memory 11 has a plurality of lock tables which are located in a main memory (not shown) and which are prepared for a sequence of the resources. Alternatively, when each resource is divisible into a plurality of subdivisions, each lock table is in one-to-one correspondence to each subdivision and is related to the other lock tables for the other subdivisions by chaining, as will become clear as the description proceeds.

At any rate, each table memorizes a lock order and a lock release order in each subdivision or each resource and is specified by a lock table address. This shows that the lock tables are successively chained by indicating a following or a preceding one of the lock table addresses.

More particularly, the illustrated lock table 15 will be referred to as a current lock table and is logically illustrated in FIG. 3. The current lock table has first, second, and third areas 15a, 15b, and 15c. The first area 15a memorizes a following lock table address which specifies a following lock table to be locked after the current lock table while the second area 15b memorizes a preceding lock table address which specifies a preceding lock table to be locked before the current lock table. In addition, the third area 15c memorizes a lock byte representative of whether the resource in question is put into a locked state or an unlocked state.

Figure 4:
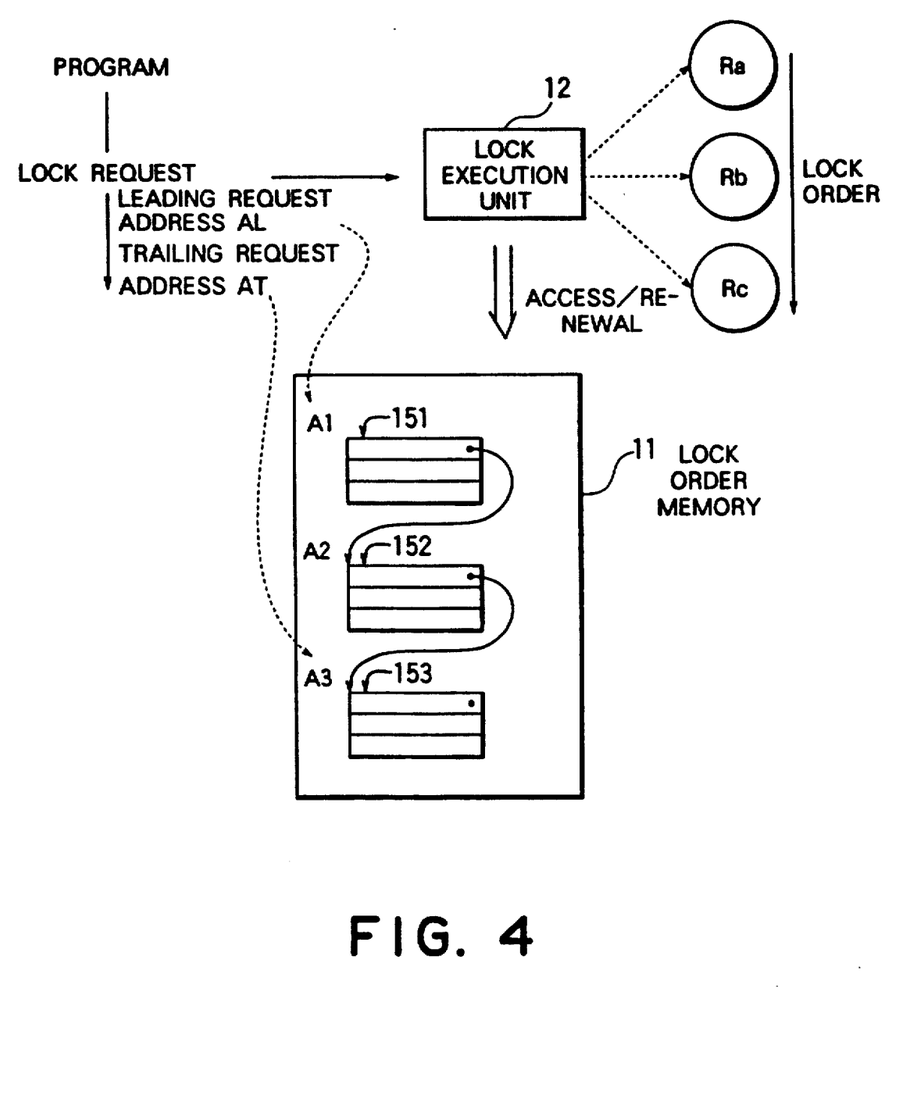
FIG. 4 is a block diagram for use in describing operation of the exclusive control system illustrated in FIG. 2.
Figure 5:
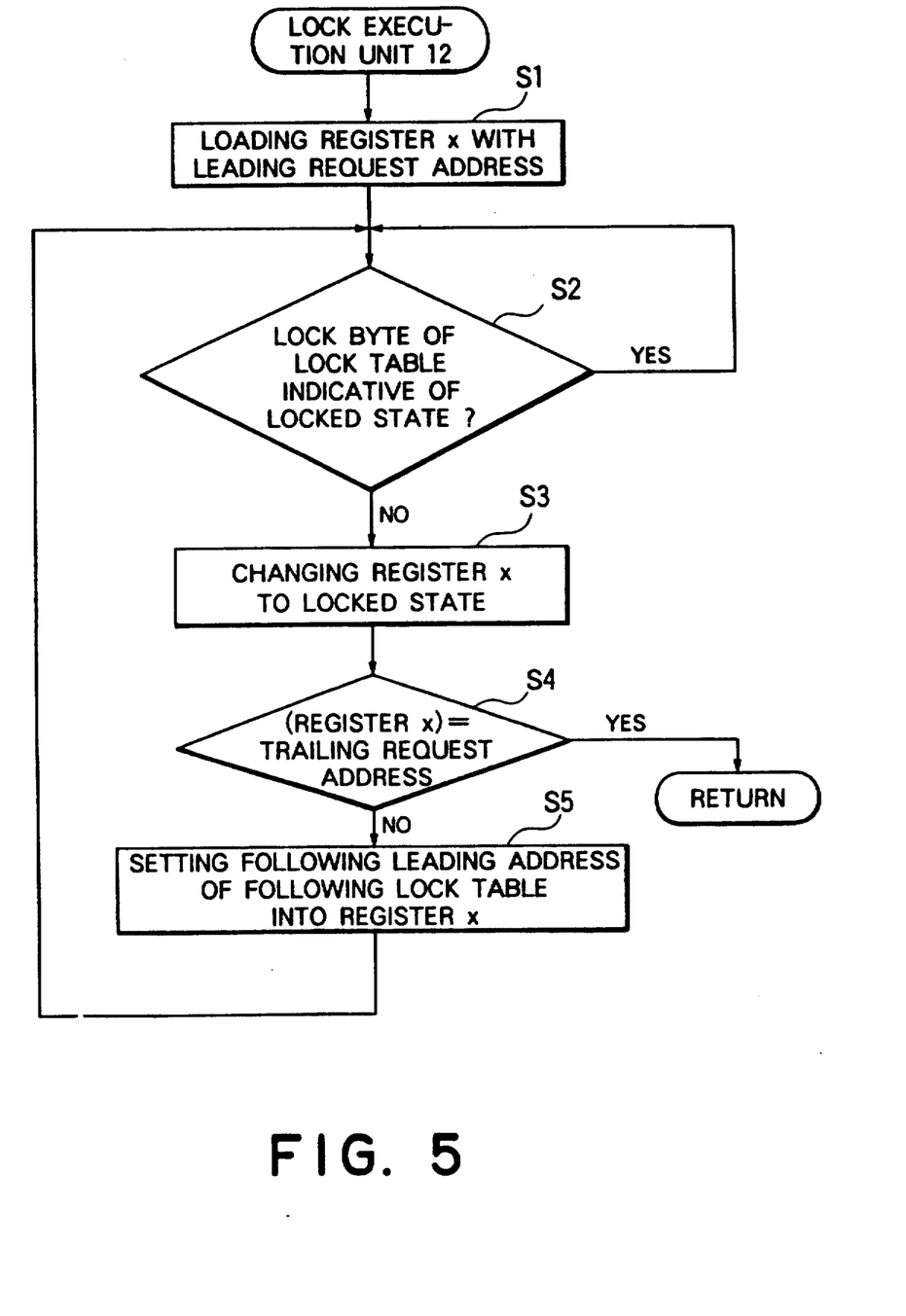
FIG. 5 is a flow chart for use in describing operation of a lock execution unit illustrated in FIG. 3.

Referring to FIGS. 4 and 5 in addition to FIGS. 2 and 3, description will be made about operation of the lock execution unit 12 (FIG. 2). In FIG. 4, it is assumed that the program delivers or issues the lock request to the lock execution unit 12 so as to successively lock or occupy in accordance with the lock order of first, second, and third resources depicted at Ra, Rb, and Rc in FIG. 4. In addition, the program supplies the lock execution unit 12 with a leading request address AL of a combination of resources to be locked and with a trailing request address AT thereof. In this event, the lock order memory 11 is loaded with first, second, and third lock tables depicted at 151, 152, and 153, respectively. The first lock table 151 is specified by a first leading address A1 of the first lock table 151. Likewise, the second and the third lock tables 152 and 153 are specified by second and third leading addresses A2 and A3 of the second and the third lock tables 152 and 153, respectively. In the example being illustrated, the first leading address A1 is assumed to be equal to the leading request address AL while the third leading address A3 is assumed to be equal to the trailing request address AT delivered from the program. This is because the first leading address A1 specifies the first lock table 151 to be at first locked by the program while the third leading address A3 specifies the third lock table 153 to be finally locked by the program. At any rate, it is to be noted that the first through the third lock tables 151 to 153 are made to correspond to the first through the third resources Ra to Rc, respectively.

In FIGS. 4 and 5, the program supplies the lock execution unit 12 with the lock request, as shown in FIG. 4. In addition, the program supplies the lock execution unit 12 with the leading and the trailing request addresses which are equal to the first and the third leading addresses A1 and A3, respectively, as mentioned above. The lock execution unit 12 comprises a central processing unit and a plurality of registers and may be therefore formed by a microprocessor operable in accordance with a predetermined program as illustrated in FIG. 5.

More particularly, when the lock execution unit 12 is supplied with the leading request address AL, a preselected one of the registers depicted at x in FIG. 5 is loaded in the lock execution unit 12 with the leading request address AL, as shown at a first step S1. In the illustrated example, the first leading address A1 (FIG. 4) is given as the leading request address AL to the lock execution unit 12. At a second step S2, the lock execution unit 12 accesses the lock byte 15c (FIG. 3) of the first lock table 151 with reference to the leading request address AL kept in the preselected register x and checks whether or not the first resource Ra (FIG. 4) is locked. When the lock byte of the first lock table 151 is indicative of the locked state, the second step S2 is repeated at a prescribed interval until the lock byte is indicative of the unlocked state.

When the lock byte is indicative of the unlocked state, the second step S2 is followed by a third step S3 at which the lock byte is changed to the locked state. Subsequently, the lock execution unit 12 checks at a fourth step S4 whether or not a content of the preselected register x is identical with the trailing request address AT. If the content of the preselected register x is not identical with the trailing request address AT, the fourth step S4 is succeeded by a fifth step S5 at which the second leading address A2 of the second lock table 152 is set into the preselected register x as a following leading address of a following lock table. In the example, the following leading address is read out of the first lock table 151 as the following lock table address by chaining, as illustrated in FIG. 4. Thus, the lock execution unit 12 cooperates with the second resource Rb with the second resource Rb kept at the locked state. This shows that the following lock table address read out of the first lock table 151 serves to put the second resource Rb into the locked state and to determine the lock order. In this connection, the following lock table address may be called the lock order signal.

Thereafter, operation is returned back to the second step S2 at which the lock byte of the second lock table 152 (FIG. 4) is checked. When the second lock table 152 is not put into the locked state, the lock byte of the second lock table 152 is changed to indicate the locked state at the third step S3. Thereafter, the content of the preselected register x is compared with the trailing request address AT.

As long as the content or the lock order signal of the preselected register x is not identical with the trailing request address AT, the preselected register x is renewed at the fifth step S5 to set the following lock table address or the lock order signal into the preselected register x in the manner illustrated in FIGS. 3 and 4. The following lock table address may be each leading table address of the first through the third lock tables 151 to 153.

At any rate, when the preselected register x is loaded with the third leading address A3 of the third lock table 153 by accessing the second lock table 152 in the illustrated example, coincidence is detected between the content of the preselected register x and the trailing request address AT at the fourth step S4. In this event, a control operation is returned back to a calling source to finish operation of the lock execution unit 12.

With this structure, the lock execution unit 12 successively searches for the first through the third lock tables 151 to 153, successively setting the lock byte into the locked state. Consequently, the first through the third resources Ra to Rc are in turn locked in the predetermined order. Herein, it is to be noted in connection with the above-mentioned system that the first through the third resources Ra to Rc are automatically locked in a correct order in response to a single lock request in spite of the fact that the second resource Rb is not indicated by the lock request. In other words, the respective resources are automatically and correctly locked merely by delivering the lock request to the lock execution unit 12 only one time.

Figure 6:
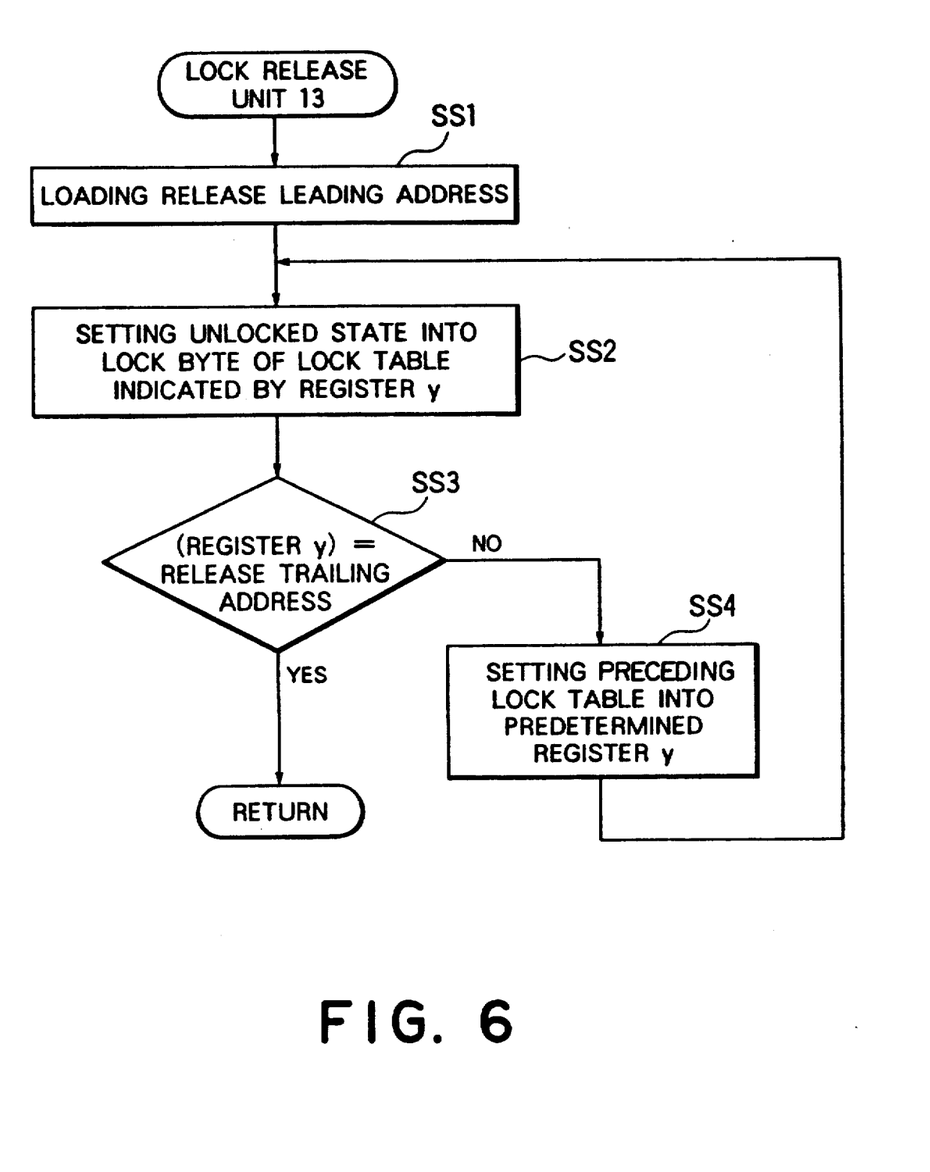
FIG. 6 is a flow chart for use in describing operation of a lock release unit illustrated in FIG. 2.

Referring to FIG. 6 afresh and FIGS. 2 and 3 again, description will be directed to the lock release unit 13 illustrated in FIG. 2. The lock release unit 13 is supplied as an input signal with a release leading address and a release trailing address and comprises a microprocessor which includes a central processing unit and a plurality of registers like the lock execution unit 12. Herein, it is noted that the release leading address is indicative of an address of a lock table corresponding to a resource which is to be first released while the release trailing address is indicative of an address of a lock table corresponding to a resource which is to be finally released.

Under the circumstances, the lock release unit 13 comprises a predetermined one y of the registers that is loaded with the release leading address at a first stage SS1. The release leading address may be the preceding lock table address illustrated in FIG. 3 and may be called a lock release order signal. Thereafter, the lock release unit 13 sets an unlocked or a released state into the lock byte of the lock table specified by the release leading address at a second stage SS2.

Subsequently, the lock release unit 13 checks at a third stage SS3 whether or not a content or a lock release order signal of the predetermined register y is identical with the release trailing address.

When the content of the predetermined register y is not identical with the release trailing address, the third stage SS3 is followed by a fourth stage SS4 at which the lock release unit 13 accesses the second area 15b (FIG. 3) in which the preceding lock table address is memorized as the lock release order signal. At the fourth stage SS4, the preceding lock table address is set into the predetermined register y. Thereafter, operation is returned back to the second stage SS2.

Thus, the unlocked state is successively memorized or set into the lock byte of the lock table 15 chained by the preceding lock table address.

As a result, when the lock release unit 13 detects that the content of the predetermined register y is identical with the release trailing address, a control operation is returned back to the calling source to finish operation of the lock release unit 13.

Thus, the lock and the lock release operations are carried out by indicating only the leading and the trailing addresses of each source by the use of the lock or the lock release requests. Specifically, the lock and the lock release operations are automatically carried out in the order memorized in the lock execution unit 12 and the lock release unit 13. Therefore, the lock and the lock release operations can be carried out by a reduced number of the lock and the lock release requests. This facilitates program coding and makes it possible to remove occurrence of an error.

While this invention has thus far been described in conjunction with a preferred embodiment thereof, it will readily be possible for those skilled in the art to put this invention into practice in various other manners. For example, each of the lock execution unit 12 and the lock release unit 13 may be structured by hardware logic. In addition, the first through the third resources Ra to Rc illustrated in FIG. 4 may be recognized as parts or subdivisions of a single resource. In this case, the lock and the lock release operations are carried out in each of the subdivisions.

What is claimed is:

1. A system for use in exclusively controlling a plurality of resources by selectively putting each of said resources into a locked state and an unlocked state in response to a lock request and a lock release request issued from a program, respectively, said system comprising:

lock order memory means for memorizing a lock order of the resources to be locked and a lock release order of the resources locked to produce a lock order signal representative of the lock order and a lock release order signal representative of the lock release order;

lock executing means responsive to said lock request and said lock order signal for successively putting the resources to be locked into the locked states in accordance with said lock order signal; and lock releasing means responsive to said lock release request and said lock release order signal for successively putting the resources locked into the unlocked states in accordance with said lock release order signal.

2. A system as claimed in claim 1, wherein said lock order memory means comprises:

a plurality of lock tables which are to be successively chained to one another and which are specified by lock table addresses, respectively, each of said lock tables having a first area memorizing, as said lock order signal, a following one of the lock table addresses specifying a following one of said lock tables, a second area memorizing, as said lock release order signal, a previous one of the lock table addresses specifying a previous one of said lock tables, and a third area memorizing a lock byte representative of whether or not the resource corresponding to each lock table is put into the locked state.

3. A system for use in exclusively controlling each resource divisible into a plurality of subdivisions by selectively putting each of said subdivisions into a locked state and an unlocked state in response to a lock request and a lock release request issued from a program, said system comprising:

lock order memory means for memorizing a lock order of the subdivisions to be locked and a lock release order of the subdivisions locked to produce a lock order signal and an lock release order signal representative of the lock order and the lock release order, respectively;

lock executing means responsive to said lock request and said lock order signal for putting each of the subdivisions into the locked state in accordance with said lock order signal; and lock releasing means responsive to said lock release signal and said lock release order signal for successively putting each of the subdivisions into the unlocked state in accordance with said lock release order signal.

4. A system as claimed in claim 3, wherein said lock order memory means comprises:

a plurality of lock tables which are to be successively chained to one another forwardly and backwardly and which are specified by lock table addresses, respectively, each of said lock tables having a first area memorizing, as said lock order signal, a following one of the lock table addresses specifying a following one of said lock tables, a second area memorizing, as said lock release order signal, a previous one of the lock table addresses specifying a previous one of said lock tables, and a third area memorizing a lock byte representative of whether or not the subdivision corresponding to each lock table is put into the locked state.

* * * * *